United States Patent [19]
Takashino

[11] 3,743,299
[45] July 3, 1973

[54] CASSETTE TAPE RECORDING AND REPRODUCING APPARATUS

[75] Inventor: Shizuo Takashino, Saitama-ken, Japan

[73] Assignee: Sony Corporation, Tokyo, Japan

[22] Filed: May 5, 1970

[21] Appl. No.: 34,722

[30] Foreign Application Priority Data

May 9, 1969 Japan ......................44/42005
May 9, 1969 Japan ......................44/42006

[52] U.S. Cl. ..............274/4 C, 179/100.2 Z, 274/4 E
[51] Int. Cl. ..............................................G11b 25/06
[58] Field of Search ......274/4 B, 4 C, 4 E, 4 F, 11 C, 274/11 B, 11 E; 242/197–200, 55.19 A; 179/100.2 Z

[56] References Cited

UNITED STATES PATENTS 2,867,389 1/1959 Viets..........................274/4 C
3,495,835 2/1970 Lao............................274/4 E
3,111,282 11/1963 Proctor......................242/200
3,075,717 1/1963 Kingston....................242/200
3,432,169 3/1969 Schroder...................242/197
3,458,158 7/1969 Ohira.........................274/4 E
3,532,292 10/1970 Crandall....................242/198
3,167,267 1/1965 Crane.........................274/4 E
3,417,938 12/1968 Markakis..................274/4 E

*Primary Examiner*—Leonard Forman
*Assistant Examiner*—Dennis A. Dearing
*Attorney*—Lewis H. Eslinger, Alvin Sinderbrand and Curtis, Morris and Safford

[57] ABSTRACT

In a tape recording and reproducing apparatus having a support and ejection device for a tape cassette and a carriage supporting a head and movable from an inactive station to a recording and reproducing station, the support and ejection device includes a pair of shouldered support blocks adjacent the recording and reproducing station which are adapted to support the forward portion of a tape cassette at a predetermined level with respect to the head; the cassette is urged into engagement with the shouldered portions of the support blocks by a resilient member engaging a rear portion thereof and is held on the shouldered support blocks by a pair of arm members mounted on the carriage and movable therewith for engagement with the cassette when the carriage is at said recording and reproducing station; the cassette is lifted from the support blocks to facilitate removal from the apparatus by a pivotally mounted platform operatively connected to an actuator system for movement from a first position below the level at which the cassette is normally supported to a second position which is elevated with respect to the recording and reproducing station.

14 Claims, 7 Drawing Figures

INVENTOR
SHIZUO TAKASHINO
BY
ATTORNEY

INVENTOR
SHIZUO TAKASHINO

BY Louis G. Eslinger

ATTORNEY

CASSETTE TAPE RECORDING AND REPRODUCING APPARATUS

This invention relates generally to tape cassette recording and reproducing apparatus, and more particularly to a cassette supporting and ejecting device for such apparatus.

Tape cassette support and ejection devices of the above type have previously been proposed which utilize a plurality of support members on which a tape cassette is seated to maintain a predetermined positional relationship with respect to the head of the apparatus during and reproducing. Typically, a pair of cylindrical support members having downwardly tapered upper portions extending from upwardly facing annular shoulders are provided adjacent the recording and reproducing station and are adapted to be inserted in circular apertures provided in the cassette. The shoulders of the pins support the cassette at the desired predetermined level, however, the cassette is free to move laterally on the support shoulders since the diameter of the cassette apertures must be larger than the diameter of the tapered upper sections of the pins in order for the pins to be properly inserted within the cassette. As a result, the cassette is not held firmly in the desired positional relationship with the head, but is free to move laterally with respect to the head when the apparatus is operated, thus causing undesirable signal distortions. This is a particular problem in cassette recorders of the portable type wherein the cassettes are more likely to be subjected to movement during recording and reproducing. In addition, due to the tapered design of the previously used support pins, the cassette is difficult to remove from the apparatus after use since, as the cassette is moved away from the shouldered support members, the apertures are fully engaged by the widening tapered portions of the pin and a substantial resistance to movement of the cassette is thereby produced.

Accordingly, it is an object of the present invention to support a tape cassette within a recording and reproducing apparatus at a predetermined positional relationship to the head of the apparatus and to maintain a predetermined lateral alignment between the recording and reproducing head and the cassette.

Another object of the invention is to facilitate removal of the cassette from the recording and reproducing apparatus.

It is a further object of the invention to support a tape cassette in a relatively fixed position with respect to the head during recording and reproducing operations.

It is a still further object of the present invention to provide a relatively inexpensive and simply constructed tape cassette support and ejection device.

In accordance with an aspect of this invention, a tape cassette recording and reproducing apparatus having a carriage supporting a head, and which is movable from an inactive station to a recording and reproducing station, is provided with a support and ejection device for a tape cassette including a plurality of support members two of which are in the form of blocks positioned adjacent the recording and reproducing station and having shouldered portions adapted to receive and support an edge portion of the cassette at a predetermined level with respect to the head. A resilient member has a cam surface adapted to engage the top edge of the cassette which is opposite to the edge portion seated on the support blocks and urges the cassette against the shouldered portions of the support blocks to hold the cassette in engagement therewith and maintain the predetermined positional relationship of the cassette with the head at the recording and reproducing station. In addition, a pair of spring biased arm members are pivotally mounted on the carriage in association with the shouldered support blocks and are urged into engagement with their respective blocks when the carriage is at the inactive station; the arm members moving along the support blocks in response to movement of the carriage from the inactive station to the recording and reproducing station to engage the top surface of the cassette at the recording and reproducing station and hold the cassette on the shouldered portions of the support blocks in the desired predetermined positional relationship wit the head.

Upon completion of the recording and reproducing process, the cassette may be ejected from the device by a lifting member which is mounted in the apparatus for movement for a first position below the cassette support members to a second position which is elevated with respect to the recording and reproducing station. An actuator system is operatively connected to the lifting member to move it from the first position to the second position and a resilient member is further provided to assist movement of the platform to each of the first and second positions from a midposition therebetween and which is also adapted to hold the lifting member in each of said first and second positions. During movement from its first to its second position, lifting member engages the tape cassette on the support blocks and raises the cassette to an elevated position for ease of removal from the apparatus.

The construction of a tape cassette support and ejection device for a tape recording and reproducing apparatus in this manner and in accordance with this invention assures the maintenance of a predetermined positional relationship between the cassette and the head of the apparatus at the recording and reproducing station. The maintenance of this positional relationship is particularly important in portable recording and reproducing apparatus since distortion due to movement of the cassette during transportation and operation of the apparatus is avoided. Moreover, the present invention permits ejection of the cassette from the support system in a relatively simple manner and thus facilities removal of the cassette from the apparatus upon completion of the recording and reproducing process.

The above, and other objects, features and advantages of this invention, will be apparent in the following detailed description of an illustrative embodiment thereof which is to be read in connection with the accompanying drawings, wherein.

Figure 1:
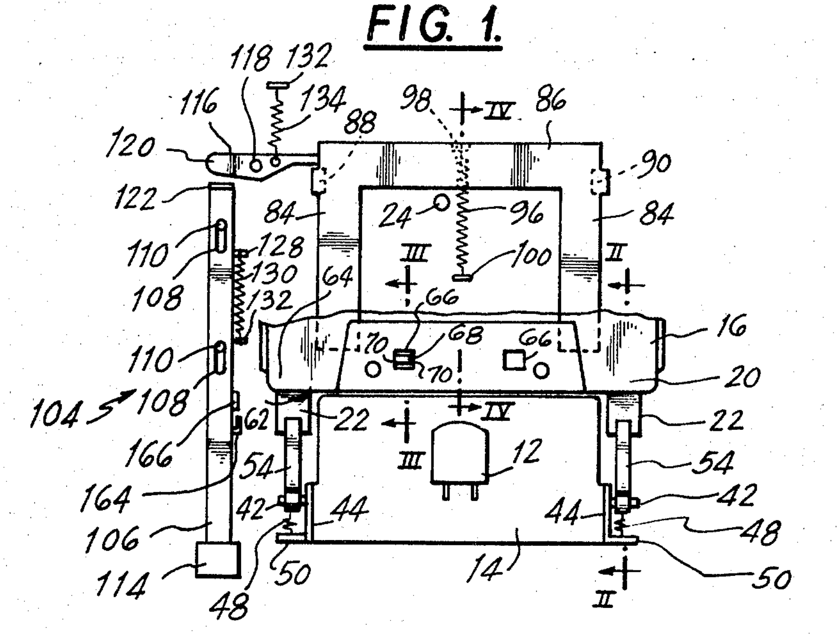
FIG. 1 is a plan view of a cassette support and ejection device according to an embodiment of the present invention, wherein the head carrying carriage is shown at its inactive station and a portion of the cassette is broken away for clarity.
Figures 5, 6:
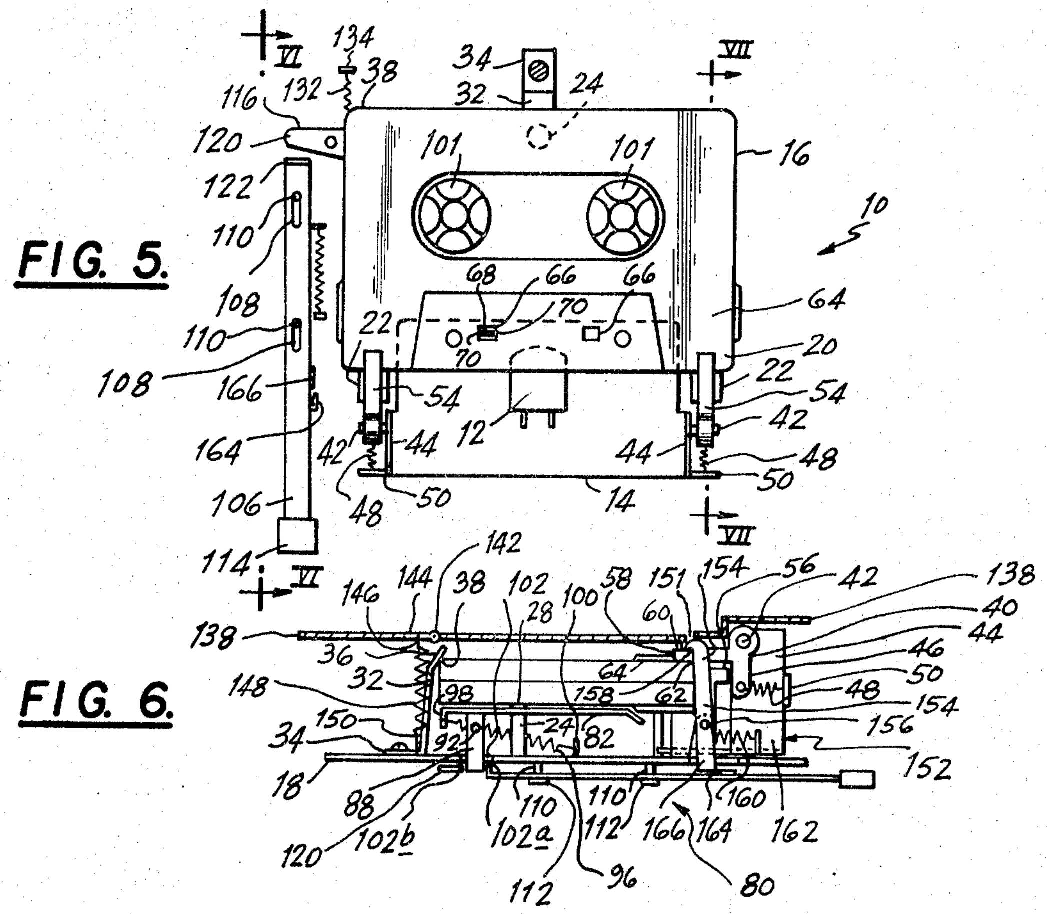
FIG. 5 is a plan view similar to FIG. 1, but with the head carrying carriage at its recording and reproducing station.
FIG. 6 is a side view taken on line VI—VI of FIG. 5.
Figure 7:
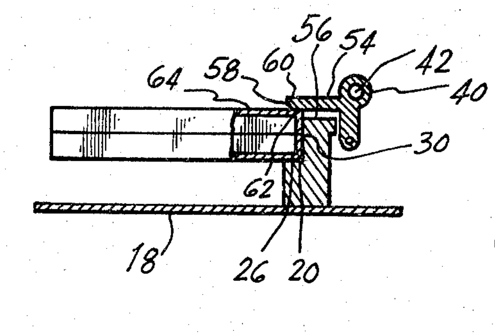
FIG. 7 is a view partly in section taken on line VII—VII of FIG. 5.

Referring to the drawings in detail, and initially to FIGS. 1 and 5 thereof, it will be seen that a tape cassette recording and reproducing apparatus 10 embodying the present invention, as shown therein, comprises a magnetic recording and reproducing head 12 mounted on a carriage 14 for movement between an inactive station (FIG. 1), wherein head 12 is remote from a cassette 16, and a recording and reproducing station (FIG. 5), wherein head 12 is operably engaged with the magnetic recording tape within cassette 16 for recording or reproducing information thereon. Carriage 14 supports, in addition to head 12, an erase head and capstan (not shown) and is mounted upon a relatively flat base plate 18 for reciprocal movement between the inactive station and the recording and reproducing station in response to actuation of playback and record controls in the apparatus which are not shown since they form no part of the present invention and moreover may be of conventional construction.

Cassette 16 is adapted to be supported with its forward edge portion 20 adjacent the recording and reproducing station by a three-point support system including a pair of support blocks 22 and a support pin 24 each of which is mounted on base plate 18. Support blocks 22 are positioned adjacent the recording and reproducing station and each is formed with a shouldered portion 26 which is adapted to receive and support edge portion 20 of cassette 16. Shoulders 26 and the upper surface 28 of pin 24, which engages the lower surface of cassette 16, as seen in FIG. 6, each lie in the same horizontal plane and cooperate to support and maintain cassette 16 at a predetermined level with respect to head 12.

As seen in FIGS. 1 and 5, carriage 14 is moved from the inactive station to the recording and reproducing station between support blocks 22 which further include vertically extending surfaces 30 adjacent shouldered portions 26 against which edge portion 20 of cassette 16 abuts, thereby to define the location of the recording and reproducing station and assure operative engagement between head 12 and the tape (not shown) contained within the cassette. Maintenance of engagement of edge portion 20 of cassette 16 against the shoulder 26 and surface 30 is assisted by a resilient arm 32 which is mounted at one end 34 on base plate 18 at a position in the device opposite recording head 12. Arm 32 includes an upper bent tab portion or cam surface 36 which is adapted to engage the top of edge portion 38 of cassette 16, which is opposite to edge portion 20. Arm 32 with cam surface 36 thus engaging cassette 16 urges the cassette toward head 12 and into engagement with vertical surfaces 30 of support blocks 22. Moreover, due to the inclined configuration of surface 36, cassette 16 is also urged downwardly against shoulders 26 and top surface 28 of pin 24 to maintain the predetermined positional relationship between head 12 and the cassette 16 at the recording and reproducing station.

Figure 2:
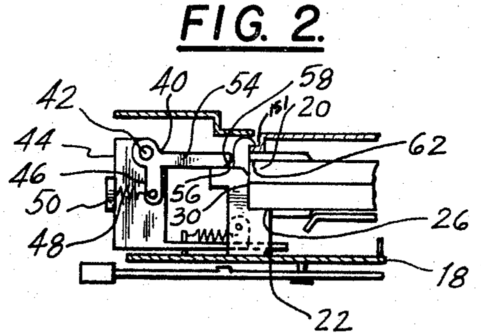
FIG. 2 is a side view taken on line II—II of FIG. 1.

In order to assure intimate contact between cassette 16 and shoulders 26 of support blocks 22 and thus assist in maintaining the relatively fixed predetermined positional relationship of the cassette with respect to the head 12, a pair of L-shaped members 40, pivotally mounted on shafts 42 in extensions 44 of carriage 14 are provided to engage cassette 16 at the recording and reproducing station. Each of members 40 includes a depending leg 46 which is biased in a relatively clockwise direction, as seen in FIG. 2, by tension spring 48 having its opposite ends connected respectively to arm 46 and tab 50 mounted on extension 44. Springs 48 thus urge horizontally extending legs 54 of arms 40 into engagement with top surface 56 of support blocks 22 when carriage 14 is at the inactive station, as shown in FIG. 2. Arms 54 have cam-shaped lower surface portions 58 at their forward ends 60 which are adapted to ride over the top 62 of edge portion 20 of cassette 16 as carriage 14 is moved from the inactive station to the recording and reproducing station and thus guide arms 54 into engagement with the cassette. It is thus seen that springs 48 urge legs 54 downwardly against the top surface 64 of cassette 16 at the recording and reproducing station and cooperate with arm 32 to hold edge portion 20 of the cassette in engagement with surfaces 26 and 30 of support blocks 22 during recording and reproducing operations to maintain the desired predetermined positional relation between cassette 16 and head 12.

Figure 3:
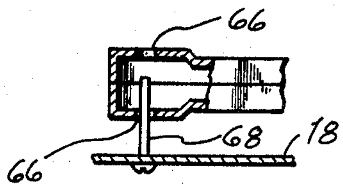
FIG. 3 is a fragmentary sectional view taken on line III III of FIG. 1.

As seen in FIGS. 1 and 5, cassette 16 is formed with generally rectangularly shaped apertures 66 which are provided to assure accurate horizontal alignment of cassette 16 with head 12, that is, lateral alignment in the direction of the predetermined level of the cassette with respect to the head. A stud member 68, having a generally rectangular cross-section and being longitudinally tapered in the lateral direction, is mounted on base plate 18 between support blocks 22, and is adapted to be inserted in and frictionally engaged with a selected one of apertures 66, in the manner illustrated in FIGS. 1 and 3. The frictional engagement of the lateral sides 70 of stud 68 with the edges of aperture 66 assures accurate lateral alignment of cassette 16 with respect to head 12 and prevents inadvertent dislodgment or movement of the cassette in this direction during the recording and reproducing operations, thus eliminating distortion due to cassette shifting within the apparatus as occurs in prior art devices wherein the cassette is generally loosely supported on support members such that it may be shifted laterally of the head during operation. In addition, since stud 68 tapers longitudinally in the lateral direction and has a smaller dimension than aperture 66 in the fore and aft direction, the cassette is readily removed from the stud without interference in the manner hereinafter described, and eliminates the difficulties found in prior art devices in removing the cassette from its support structure.

Figure 4:
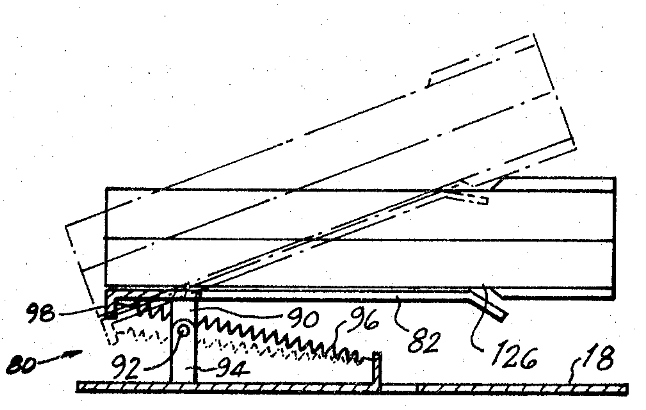
FIG. 4 is a view partly in section taken on line IV—IV of FIG. 1 and showing the ejection support platform and cassette in their raised position in dotted lines.

Upon completion of recording and reproducing operations, carriage 14 and head 12 may be returned to the inactive station (FIG. 1) in a conventional manner, as for example, upon operation of the stop, rewind or fast forward controls, releasing cassette 16 from beneath arms 54, whereby the cassette can be removed from support blocks 22 and 24 by ejection mechanism 80 illustrated in FIGS. 4 and 6.

Ejection or lifting mechanism 80 includes a support platform 82 which is formed as a generally U-shaped member (FIG. 1) having a pair of legs 84 and an interconnecting bight portion 86 located at the rear of the apparatus with respect to head 12. Platform 82 further includes a pair of downwardly extending arms 88 and 90 which are pivotally mounted on a shaft 92 carried by upstanding tabs 94 on base plate 18 to permit movement of platform 82 between a horizontal or first position, illustrated in dotted lines. A resilient member 96, which preferably comprises a tension spring, is connected at its opposite ends on opposite sides of pivot shaft 92 to extension tab 98 on bight 82 and an upstanding tab 100 on base plate 18. The points of connection of spring 96 with platform 82 and base plate 18, are located, as seen in FIG. 4, to urge platform 82 towards its raised position from a mid-point between its horizontal and raised positions when the centerline of the spring is moved to a point above the centerline of shaft 92.

Arm 88 depending from platform 82 is longer than arm 90, and extends downwardly through an aperture 102 in base plate 18. The raised position of platform 82 is defined by engagement of arm 88 with the forward edge 102*a* of aperture 102 against which arm 88 is held by the biasing force of spring 96 which urges platform 82 in the counter-clockwise direction, as seen in FIG. 4, about pivot shafts 92 when the platform is in its raised position. Thus platform 82 is held in a stable manner so as to be tilted upwardly away from head 12 for reception of a cassette 16 prior to the recording and reproducing operations. Cassette 16 is thence seated on tilted platform 82 with its rear edge 38 positioned beneath cam surface 36 of arm 32, whereupon the cassette is depressed against the bias of spring 96 so as to be moved with platform 82 towards the horizontal position of platform 82. As spring 96 is moved to a position above the centerline of shaft 92 it will automatically complete movement of platform 82 to its horizontal position which is limited or defined by engagement of arm 88 with the rear edge 102*b* of aperture 102 under the biasing action of spring 96.

In its horizontal position, platform 82 is located below shoulders 26 of support blocks 22 and top surface 28 of pin 24 so that cassette 16 is automatically seated on shoulders 26 and surface 28 in its predetermined positional relationship with head 12. In addition, depression of cassette 16 towards the second or horizontal position of platform 82 automatically engages stud 68 in aperture 66 for accurate lateral alignment of the cassette with head 12 and tape reel hubs 101 within cassette 16 are engaged with reel drive spindles (not shown) extending upwardly through base plate 18.

To reverse the process, that is, to initiate pivotal movement of platform 82 from its horizontal position to its raised or tilted position and thereby eject cassette 16 from the recording and reproducing station, an actuator system 104 is provided which includes a slide member 106 having a pair of guide apertures 108 which receive guide members 110 depending from platform 18 and have enlarged head members 112 to retain slide 106 thereon. Slide 106 has an actuator or finger portion 114 by which the slide may be moved from the position illustrated in FIG. 1 into engagement with a lever 116 which is adapted to engage the end portion of leg 88 and initiate pivotal movement of platform 82 towards its raised position. Lever 116 is pivotally mounted on a pin 118 and has an arm 120 at one end which is engageable by end 122 of slide member 106 upon movement thereof to pivot lever 116 about shaft 118 in a generally clockwise direction (FIG. 1) whereby leg 124 of lever 116 urges leg 88 counter-clockwise as seen in FIG. 6 to move the platform 82 towards its raised position. As spring 96 is moved to a position below the centerline of shaft 92 it will be effective to continue the pivotal movement of platform 82 to its raised position, wherein arm 88 again engages edge 102*a*. As platform 82 moves towards its second or raised position it engages the lower surface 126 of cassette 16 to lift the cassette from support blocks 22 and pin 24 and disengage stud 68 from aperture 66 to eject or raise the cassette from the recording and reproducing station. As previously noted, arms 54 will already have been disengaged from cassette 16 by movement of carriage 14 to the inactive station on actuation of the stop or rewind controls.

Referring again to FIG. 1, it is seen that slide member 106 is provided with an extension 128 to which is attached one end of a resilient member or spring 130. The opposed end of spring 130 is connected to a tab 132 which also depends from platform 18, whereby spring 128 will bias slide member 106 to the position shown in FIG. 1 wherein end 122 thereof is disengaged from arm 120 of lever 116 and slots 108 engage studs 110 to limit movement of actuator 106 away from lever 116.

Lever 116 is biased to move its leg 124 out of engagement with leg 88 by a spring 132 which, as seen in FIG. 1, is fixed at one end to leg 124 and, at its opposed end, to tab member 134 which also depends from platform 18.

The support and ejection device previously described is contained within a housing 138 of the recording and reproducing apparatus, and an articulated cover 140 is provided which is adapted to enclose cassette 16 within the housing when the cassette is positioned at the recording and reproducing station. Cover 140 is pivotally mounted at its rear edge 142 on housing 138 for movement between a horizontal or first position and a raised or second position, which correspond to the horizontal and raised positions, respectively, of platform 82. Rear edge 142 of cover 140 is provided with an extension 144 which is engaged by one end 146 of a tension spring 148 whose opposed end 150 is fixed to base plate 18 to urge or bias cover 140 to its raised position, whereby support platform 82 is exposed to facilitate insertion of a cassette within the device in the manner previously described.

When cassette 16 is depressed against the bias of spring 96 acting on platform 82 and is seated on support members 22 and 24, cover 140 may be manually depressed to its horizontal position wherein the stepped or shouldered front edge 151 of the cover is engaged by latching mechanism 152. Latching mechanism 152 includes a latch lever 154 which is pivotally mounted on shaft 156 and has a shouldered end portion or hook 158 adapted to engage front edge 151 of cover 140. As seen in FIG. 6, lever 154 is spring biased into engagement with edge 151 by a spring 160 whose ends are respectively connected to lever 154 and an upstanding tab member 162 on base plate 18 to thereby hold the cover in its horizontal position against the bias of spring 148.

To release hook 158 from edge 151 and thereby release cover 140 to permit ejection of cassette 16, slide member 106 is provided with a tab 164 (FIGS. 1 and 6) which is adapted to engage the lower end 166 of lever 154 so that as slide 106 is moved into engagement with lever 116 to move support platform 82 to its raised or second position, tab 164 will engage lever 154 to move the latter in a generally clockwise direction (FIG. 6) about pivot shaft 156 and thereby disengage hook 158 from edge 151, whereby cover 140 is free to pivot upwardly to its raised position 82 and cover 140 are simultaneously raised from their first or horizontal positions to their raised positions from movement of the actuator system 104 to facilitate removal of cassette 16 from the device.

It will be apparent that a relatively simple and inexpensive apparatus is provided for positioning and supporting a tape cassette in a predetermined positional relationship with the magnetic head of a recording and reproducing apparatus by means of shouldered support blocks 22, stud member 68 and arms 54 which maintain cassette 16 in engagement with shoulders 26 of support blocks 22 when carriage 14 and head 12 are moved to the recording and reproducing station. In addition, it is seen that the above described support system is readily adapted for use in conjunction with an ejection apparatus for lifting cassette 16 from support blocks 22 and stud member 68 and away from the recording and reproducing station for ready removal thereof from recording and reproducing apparatus.

While the above embodiment of the present invention has been described as being adapted to operate particularly in sound recording and reproducing tape cassettes, it is apparent that a cassette supporting and ejection device in accordance with the present invention may equally be adapted for use in video tape recording and reproducing apparatus. Further, although a particular illustrative embodiment of the present invention has been described herein with reference to the accompanying drawings, it is to be understood that the invention is not limited to that precise embodiment, and that various changes and modifications may be effected therein by one skilled in the art without departing from the scope or spirit of this invention.

What is claimed is:

1. A cassette tape recording and reproducing apparatus, comprising a base plate, a carriage having a head thereon and being movably mounted on said base plate for movement parallel to the latter between first and second positions at which said head is disposed at an inactive station and a recording and reproducing station, respectively, supporting means including a pair of support members fixed on said base plate and having shouldered portions facing away from said base plate for receiving and supporting a first edge portion of a tape cassette extending adjacent said recording and reproducing station at a predetermined level with respect to said head, a resilient member mounted on said base plate for engaging the edge portion of said cassette which is opposite said first edge portion and urging the cassette toward said recording and reproducing station and onto said shouldered portions, hold-down members mounted on said carriage and extending over said shouldered portions and over said first edge portion of the cassette supported thereon upon movement of the carriage to said second position for disposing said head at said recording and reproducing station, said hold-down members being resiliently urged to bear upon said first edge portion when extending thereover, whereby to ensure the exact positioning of the cassette with respect to said head when the latter is moved to said recording and reproducing station, and the movement of said carriage to said first position for disposing said head at said inactive station being effective to withdraw said hold-down members from over said shouldered portions so that the latter are free to receive said first edge portion of the cassette.

2. Apparatus as in claim 1, further comprising means for lifting said cassette from said supporting means.

3. Apparatus as in claim 2, wherein said lifting means comprises a lifting member mounted for movement between a first position in which said lifting member is below said shouldered portions and a second position in which at least part of said lifting member is above said shouldered portions whereby said cassette is adapted to be displaced by said lifting member from said shouldered portions for removal from said apparatus, and means for moving said lifting member between said first and second positions.

4. Apparatus as in claim 3, wherein said means for moving said lifting member includes a resilient means selectively operative to hold said lifting member in each of said first and second positions.

5. Apparatus as in claim 3, further comprising a cover movable to positions spaced from and corresponding to said first and second positions of said lifting member, and means for moving said cover in conjunction with said lifting member and for holding said cover in each of its respective positions.

6. In a tape recording and reproducing apparatus having a carriage supporting a head and movable between an inactive station and a recording and reproducing station; a support structure for a tape cassette which has at least one alignment aperture therein, said support structure comprising a plurality of support blocks positioned adjacent said recording and reproducing station and having shouldered portions adapted to receive and support an edge portion of said cassette at a predetermined level with respect to said head, individual arms associated with said support blocks and being pivotally mounted on said carriage, means for biasing each of said arms into slidable engagement with its respective block when the carriage is at said inactive station so that said arms move along said blocks in response to movement of the carriage from said inactive station to said recording and reproducing station for extending over and engaging the top surface of said edge portion of the cassette at the last mentioned station to hold said cassette on said shouldered portions of said support blocks for maintaining said cassette at said predetermined level with respect to said head, and means urging said cassette into engagement with said shouldered portions and to a predetermined positional relationship to said head at said recording and reproducing station.

7. Apparatus as in claim 6, further including means engaging said cassette alignment aperture when said cassette is at said predetermined level and maintaining a predetermined alignment between said head and said cassette in the direction of said level.

8. Apparatus as in claim 7, wherein said means engaging the cassette alignment opening comprises a stud member adapted to be friction fit in said alignment aperture.

9. Apparatus as in claim 6, wherein said means urging the cassette comprises a resilient member having a cam surface adapted to engage the top of the edge portion of said cassette which is opposite to the first mentioned edge portion to urge said cassette against said shouldered portions and toward said head.

10. Apparatus as in claim 6, wherein each of said arms include a lower cam surface adapted to facilitate engagement of said arms with said cassette during movement of said carriage from said inactive station to said recording and reproducing station.

11. In a tape recording and reproducing apparatus having a carriage supporting a head and movable from an inactive station to a recording and reproducing station; a support and ejection device for a tape cassette which has at least one alignment aperture therein, said device comprising a plurality of support blocks positioned adjacent said recording and reproducing station and having shouldered portions adapted to receive and support an edge portion of said cassette at a predetermined level with respect to said head, individual arms associated with said support blocks and being pivotally mounted on said carriage, means for biasing each of said arms into slidable engagement with its respective block so that said arms move with said carriage and along said blocks in response to movement of the carriage from said inactive station to said recording and reproducing station for extending over and engaging the top surface of said edge portion of the cassette at said last mentioned station to hold said cassette on said shouldered portions of said support blocks and thereby maintain said cassette at said predetermined level with respect to said head, means for urging said cassette into engagement with said shouldered portions and to a predetermined positional relationship to said head at said recording and reproducing station, cassette lifting means mounted in said apparatus for movement from a first position below said shouldered portions to a second position at which at least part of said lifting means is elevated with respect to said recording and reproducing station, means for moving said lifting means from said first position towards said second position whereby said lifting means is adapted to engage a tape cassette on said support blocks and move said cassette to said second position, and means for holding said lifting means in each of said first and second positions.

12. Apparatus as in claim 11, including stud means mounted in said apparatus and adapted to be friction fit in said alignment aperture for maintaining a predetermined alignment between said head and said cassette in the direction of said level.

13. Apparatus as in claim 11, wherein said lifting means comprises a pivotally mounted platform and said holding means comprises a resilient member operably engaged with said platform and adapted to assist movement thereof to each of said first and second positions from a mid-position therebetween.

14. Apparatus as in claim 13, wherein said means for moving said lifting means from said first position towards said second position comprises actuator means for pivoting said platform from said first position to at least said mid-position whereby said resilient member is adapted to complete movement of said platform towards said second position.

* * * * *